United States Patent [19]
Kato et al.

[11] 3,790,360
[45] Feb. 5, 1974

[54] PROCESS FOR PRODUCING METAL COATED GLASS-CERAMIC ARTICLES

[75] Inventors: Taketosi Kato; Masakazu Umetsu, both of Nagoya; Toshio Kobayashi, Aichi, all of Japan

[73] Assignee: Ishizuka Garasu Kabushiki Kaisha, Aichi-ken, Japan

[22] Filed: Feb. 23, 1972

[21] Appl. No.: 228,757

[52] U.S. Cl............................. 65/32, 65/33, 65/60, 65/30, 65/59
[51] Int. Cl.............................. C03b, C03b 29/00
[58] Field of Search ..................... 65/32, 33, 60, 59

[56] References Cited
UNITED STATES PATENTS

| | | | |
|---|---|---|---|
| 3,464,806 | 9/1969 | Seki et al. | 65/32 |
| 3,490,887 | 1/1970 | Herczog | 65/32 X |
| 3,557,576 | 1/1971 | Baum | 65/32 X |
| 3,639,113 | 2/1972 | Aslanova et al. | 65/33 |
| 3,231,456 | 1/1966 | McMillan | 65/32 X |
| 3,704,110 | 11/1972 | Finn | 65/32 |

*Primary Examiner*—Frank W. Miga
*Attorney, Agent, or Firm*—Leonard W. Sherman et al.

[57] ABSTRACT

A method of producing a metal coated glass-ceramic article which comprises melting a glass-forming batch containing a nucleating agent and 0.05 to 5 percent by weight, calculated as the metal based on the total weight of the glass-forming batch, of at least one metal compound selected from copper compounds and silver compounds, forming the melt into a glass article of desired configuration, heating the formed glass article in a reducing atmosphere to devitrify the glass, while causing the metallic ions generated from said metal compound by said reducing atmosphere to migrate through the glass matrix and diffuse to the surface of said devitrified article and to reduce the metallic ions to the state of metallic particles on the surface, heating the article in an oxidizing atmosphere to oxidize the metallic particles to the state of metal oxide crystalline particles bonded to each other, and heating the so obtained article again in a reducing atmosphere to reduce said metal oxide to its metallic state on the surface of devitrified article.

3 Claims, No Drawings

PROCESS FOR PRODUCING METAL COATED GLASS-CERAMIC ARTICLES

This invention relates to an improved process for producing glass-ceramic articles, which have been coated with a conductive coating of either metallic copper or silver, or of both these metals.

Glass-ceramics or devitroceramics, as is well known, are crystalline ceramics, which have been made by the crystallization of a glass body under controlled conditions. Glass-ceramics are made by using the conventional glass making techniques to melt a glass-forming batch containing a nucleating agent and/or a crystallization accelerator, molding the resulting melt and thereafter heat treating the shaped article under controlled conditions. The shaped glass article is divitrifed by this heat treatment. In other words, the shaped glass artilce is transformed into a glass-ceramic composed of minute crystals dispersed nearly uniformly throughout the glass matrix.

One method for forming a metallic coating on the surface of glass-ceramic articles is disclosed in Japanese Pat. No. 479,655, U. S. Pat. No. 3,464,806, German Pat. No. 1,496,540, French Pat. No. 1,383,611 and British Pat. No. 944,571. The first four of the foregoing patents and the instant invention are assigned to a common assignee. This method is characterized in that a small quantity of either a copper or silver compound in addition to the nucleating agent is incorporated into the starting glass batch used and the devitrification heat treatment is carried out in a reducing atmosphere. During the process of crystallization of the glass by the devitrification heat treatment the metal compound, which has been incorporated in the glass batch, migrates through the glass matrix to the surface of the article in the form of metallic ions. The metallic ions, which have become diffused at the surface, are reduced to minute metallic particles on exposure to the surrounding reducing atmosphere, with the consequence that a glass-ceramic article having a metallic coating layer or film is obtained. However, a major portion of the fine-grained metallic particles formed by reduction in such a method are present as indepent particles. Therefore, a continuous metallic film layer is not produced. This coating consisting of minute metallic particles can be changed to a continuous metallic layer by submitting the surface of the article to a mechanical step such as a buffing treatment, thus flattening and bonding the metallic particles by the rubbing action to obtain an even and smooth continuous surface. However, great diffculty is experienced in buffing of the whole surface in the case of inner surfaces of fine tubular articles or articles having a complicated configuration.

We have now found that in making metal coated glass-ceramic articles a smooth, continuous phase metallic coating can be directly formed when, following the hereinbefore described heat treatment in a reducing atmosphere, the article is submitted to a heat treatment in an oxidizing atmosphere and thereafter again submitted to a heat treatment in a reducing atmosphere. The following reason can be given to explain why a continuous metallic coating is formed by such a three-state heat treatment. The minute metallic crystalline particles deposited discretely on the surface of the article as a result of the first heat treatment in a reducing atmosphere are oxidized to the form of a metal oxide by the second heat treatment in an oxidizing atmosphere, with the consequence that the crystalline form becomes enlarged and particles adjacent to each other becomes bonded to each other, after which the metal oxide crystals, while still retaining their bonded state, are again reduced to their metallic form by the third heat treatment in a reducing atmosphere. This resulting continuous metallic coating can be observed by an electron microscope, and also can be shown by a measurement of its conductivity.

Thus, a continuous metallic coating whose particles are in intimate contact with each other is formed according to the instant invention the basis of the foregoing discovery. Therefore, there is no necessity for a buffing treatment of the article. Further, since the invention is applicable to glass-ceramic articles of any configuration, the difficulty experienced in the prior art in buffing articles of complicated configuration is obviated. Again, the metallic coating formed by this method, being integrally adhered to the glass-ceramic body, has a stripping force far greater than the metallic coatings obtained by such other methods as vacuum evaporation, painting, baking, spattering or the like, its value being about 1.0–2.0 kg/mm$^2$, and an average of about 1.5 kg/mm$^2$. Further, it becomes possible according the invention method to control the thickness and structure of the metallic coating of the final product by adjusting the amount added to the starting glass batch of the metal compound for the coating and/or the conditions under which the heat treatment is carried out in the oxidizing atmosphere. Therefore, a metal coated glass-ceramic article having the desired conductivity can be otained.

Thus, the present method is very effective for making metal coated glass-ceramic articles having the required conductivity, which make them useful as the base material of printed circuits, capacitors, electronic components and the like. In addition, the products of the invention are suitable for making various articles for daily use, such as decorative items and the like, since they have a fine metallic luster. If necessary, the formed coated surface can be further plated with such metals as copper, silver and other metals which can be applied by the electroplating technique.

It is therefore an object of this invention to provide an improved process for producing glass-ceramic articles which have a closely bonded metal coating of either copper or silver, or of both these metals. Another object is to provide a process for producing a metal coated glass-ceramic article having a controlled conductivity.

Other objects and advantages of the invention will become apparent from the following description.

According to the present invention there is provided a process for producing a metal coated glass-ceramic article which comprises melting a glass-forming batch containing a nucleating agent and 0.05 to 5 percent, calculated as the metal based on the total weight of the glass-forming batch, of at least one compound of a metal of the group consisting of copper compounds and silver compounds, forming the melt into a glass article of the desired configuration, submitting the formed glass article to a first heat treatment in a reducing atmosphere to devitrify the glass, while causing the metallic ions generated from said metal compound to migrate through the glass matrix and diffuse to the surface of said devitrified article and to reduce the metallic ions to the state of metallic particles on the surface, followed by a second heating of the article in an oxidizing temperature to oxidize the metallic particles to the state of metal oxide crystalline particles bonded to each other, and thereafter a third heating of the resultant article again in a reducing atmosphere to reduce said metal oxide to its metallic state, whereby the metal coating is formed on the surface of the devitrified article.

As previously indicated, the method of producing a metal coated glass-ceramic article by melting a glass-forming batch containing a nucleating agent and a metal compound, the source of the metal coating, then forming the melt into the desired shape, and thereafter heat treating the resultant article in a reducing atmosphere is known. Therefore, the most important feature of the present invention resides in submitting the article, following its heat treatment in the aforesaid reducing atmosphere, to a second heat treatment in an ozidizing atmosphere and thereafter finally to a third heat treatment again in a reducing atmosphere.

The preferred embodiments of the invention will be more fully described below.

Almost all known glasses are metastable at room temperature with respect to the more stable crystalline state, and thousands of glass compositions, comprising all of the commonly used glass making ingredients, have already been sucessfuly crystallized to glass-ceramics. Therefore, the present invention is not restricted as to the composition of the glass-forming batch. However, typical glass compositions that are preferred for use in the instant invention are those of the silica-alumina-lithia, silica-alumina-lithia-magnesia, silica-alumina- lithia-zinc oxide, silica-alumina-magnesia, silica-alumina-calcium oxide and silica-lithia systems. The amounts of the ingredients contained in these compositions may be, on a weight basis, in the range of 40 – 88 percent silica, 1 – 35 percent alumina, 0.5 – 40.7 percent lithia, 0.5 – 30 percent magnesia, 1 – 30 percent zinc oxide and 1 – 15 percent calcium oxide. In addition, other ingredients may also be present, if desired. For example, up to 10 percent of boron oxide, up to 22 percent of sodium oxide and/or potassium oxide, and up to 15 percent of lead oxide may be contained in the compositions.

As the nucleating agents and crystallization accelerators, various agents have also been known. All of these known agents are useable in the present invention. The preferred nucleating agents, include titania, zirconia, fluorine, phosphorus pentaoxide, titania-zirconia, titania-zirconia-fluorine, zirconia-fluorine, titania-fluorine, phosphorus pentoxide-fluorine, titania-phosphorus pentoxide, zirconia-phosphorus pentoxide, titania-phosphorus pentoxide-fluorine, zirconia-phosphorus pentoxide-fluorine, titania-zirconia-phosphorus pentoxide and titania-zirconia-phosphorus pentoxide-fluorine. These agents are used in amounts, based on the total weight of the glass-forming batch, of 0.5 – 20 percent titania, 0.5 – 15 percent zirconia, 0.2 – 15 percent fluorine and 0.5 – 20 percent phosphorus pentoxide. In addition to the foregoing nucleating agents, useable also are calcium fluoride, tin oxide, beryllium oxide, chromium oxide, vanadium oxide, nickel oxide, arsenic oxide and molybdenum oxide, each of which may be used in the range of 1 – 10 percent.

The metal compound to be incorporated in the glass-forming batch as the source of the metal to be coated is a compound of either copper or silver, or a mixture thereof. Suitable compounds, include the oxides of these metals or the compounds capable of being converted to the oxides in an oxidizing atmosphere at elevated temperatures, i.e., practically all of the usually available metal compunds. Typical are the oxides, halides, sulfites, sulfates, nitrates, phosphates and hydroxides of either copper or silver. These metal compounds are added in an amount of 0.05 – 5 percent, calculated as metal based on the total weight of the glass-batch, to ensure a sufficiently coherent and stable coating and to prevent interference with the migration of the ions in devitrification step.

The glass-forming batch containing the above nucleating agent and metal compound is first melted in accordance with the conventional glass making technique and then formed into a transparent glass article of the desired configuration. This is followed by submitting the formed glass article to devitrification conditions in a reducing atmosphere. The conditions may be those which have been previously known as conditions for the manufacture of glass-ceramics. That is, the article is gradually heated up to a temperature above the transition point of glass and held at a temperature at which the crystallization of glass takes place. The heating rate should preverably not exceed 5° C. per minute (300° C. per hour). The temperature at which the article is held is a temperature between the transition point of glass and the melting point of the metal to be coated. The melting point of copper is 1,080° C. and that of silver is 963° C. While the transition point of glass will vary depending on the batch composition used, it can be confirmed from the measured differential thermal curve. The holding time is usually from about 15 minutes to about 5 hours.

In forming the reducing atmosphere, hydrogen, carbon monoxide and such combustible gases as methane, ethane, propane, butane and town gas can be used.

In the process of the above described heat treatments, metallic ions corresponding to the compounds of copper or silver added are formed, and owing to their high mobility they migrate through the glass matrix and diffuse to the surface of the glass article. The migration of the ions to the surface of the article becomes faster as the temperature rises, and the amount of migration increases with the passage of time. A gradient in the concentration of metallic ions inwardly from the surface is seen when a devitrified article is observed by means of an election micro X-ray analyzer, and the presence of a very striking peak in the concentration distribution is noted in the region 5 – 20 microns deep from the surface.

The metallic ions which have been thus diffused to the surface of the article during the devitrification process come into contact with the surrounding reducing atmosphere and are reduced to their metallic form. A major portion of the reduced metal becomes discretely deposited on the whole of the article surface as minute crystalline particles. It will be understood that the thickness of the deposited metal layer may be controlled by varying the amount of metal compound used and/or the treating temperature and time.

Following the aforesaid heat treatment in a reducing atmosphere, a second heat treatment in an oxidizing temperature is carried out. The oxidizing atmosphere can be formed of either oxygen or an oxygen-containing gas such as air. Prior to the introduction of the oxidizing gas, the previously present reducing gas is conveniently purged with an inert gas such as nitrogen or helium. The temperature that is preferably employed in this heat treatment step is one which is in the range between 200° C. and the melting point of the coated metal. The minute-crystalline particles of metal deposited on the surface of the devitrified article in the prior step is oxidized by exposure to the oxidizing atmosphere at an elevated temperature in this second heat treatment step and is converted to a metal oxide. Since the discrete, minute metallic particles change their form and become larger in size during their transformation to an oxide, the oxidized particles become bonded to each other. The degree of the bonding depends on the temperature and time of the heat treatment and is enhanced concomitantly with an increase in the temperature and/or increase in the time. In accordance with the degree of bonding that is desired, the heat treatment time can be varied from a short period of time, say, about one second to about 1.5 hours within the above noted temperature range.

The product resulting from the foregoing second heat treatment is finally submitted to a third heat treatment in a reducing atmosphere again. This reducing atmosphere is the same as that described in connection with the first step, while the heat treatment temperature is one between 200° C and the melting point of the coated metal, as in the case with the second step. The metal oxide coating formed on the article surface during the second step is again reduced to its metallic form by exposure to the reducing atmosphere in this third step. In this case, the metal oxide particles, which have been bonded in the second step, are reduced while maintaining their bonded state intact. Hence, the reduced metallic particles are also bonded to each other to form a continuous phase. This clearly differs from the noncontinuous phase obtained in the first step, a phase composed of reduced particles discretely deposited on the surface of the article. While the heat treatment time in the third step must be one in which at least a part of the metal oxide is reduced to metal and will vary depending on the temperature employed, it is usually a minimum of about 30 seconds. It is not necessarily required that all of the metal oxide particles are completely reduced. The degree of reduction can be suitably chosen in accordance with the conductivity desired in the final product. Thereafter, the article is allowed to cool to room temperature under conditions which do not oxidize the metal coating formed by reduction. Thus, the final product is obtained.

As can be appreciated from the foregoing discussion, the magnitude of the conductivity of the final product not only depends upon the amount of the metal compound incorporated in the starting glass-forming batch but also can be controlled principally by the degree of bonding of the metal oxide particles during the second heat treatment step as well as the conditions of the third heat treatment step. The temperatures and times of the heat treatments that are employed for obtaining the desired conductivity values can be readily determined by means of routine experimental work.

The final product obtained by the above described method has on its surface a strongly coherent coating consisting of either copper or silver, or of both these metals, and having the desired conductivity value. And the crystalline structure of the glass-ceramic body is chiefly dependent on the composition of the starting glass batch and is confirmed by X-ray diffraction analysis to be either $\beta$-euqriptite, $\beta$-spodumen, anorthoclase, diopside or anthrophirite.

EXAMPLE 1

Starting glass batches containing nucleating agents and copper compounds of varied compositions were melted, and glass article samples were prepared by molding the melts into a cylindrical shape 5 mm in diameter and 15 mm in length. These samples were submitted to the first, second and third heat treatments, in accordance with the method of the present invention. The first heat treatment was carried out in an atmosphere of hydrogen, the second heat treatment, in an atmosphere of air, and finally the third heat treatment was again carried out in an atmosphere of hydrogen. In all cases, a glass-ceramic article coated with copper was obtained.

Runs 1 – 8 were carried out, the results of which are shown in Table I. While the copper ingredient for forming the metallic coating is shown as $CuO_2$ in the table, in Run 7 copper sulfate is used.

The heating rate shown in the table is the rate at which the temperature was raised per hour to heat the sample up to the maximum temperature in the first heat treatment. And the electrical resistance ($\Omega$) is the resistance of the final product, as measured between the two ends of the cylindrical sample.

TABLE I

| Run No. | 1 | 2 | 3 | 4 | 5 | 6 | 7 | 8 |
|---|---|---|---|---|---|---|---|---|
| Glass composition (wt. %) | | | | | | | | |
| $SiO_2$ | 59.3 | 54.0 | 54.5 | 58.2 | 57.8 | 78.7 | 52.4 | 67.9 |
| $Al_2O_3$ | 15.0 | 15.0 | 17.5 | 12.0 | 11.9 | 3.9 | 4.6 | 16.0 |
| $Li_2O$ | 5.0 | 3.0 | 3.0 | 2.1 | 2.1 | 12.1 | 10.7 | 5.2 |
| MgO | 6.0 | 10.0 | 10.0 | 8.3 | 8.3 | — | 10.7 | 3.4 |
| CaO | — | — | — | 6.1 | 6.1 | — | — | — |
| $B_2O_3$ | 4.0 | — | — | — | — | — | — | — |
| $Na_2O$ | — | — | — | 3.7 | 3.7 | — | — | — |
| $K_2O$ | — | — | — | 0.9 | 0.9 | 2.4 | — | — |
| $ZrO_2$ | 4.0 | 5.5 | 5.5 | 3.0 | 3.0 | — | 7.6 | — |
| F | 5.0 | 8.0 | 8.0 | 5.2 | 5.2 | — | — | — |
| $TiO_2$ | — | — | — | — | — | — | — | 6.5 |
| $P_2O_5$ | — | — | — | — | — | 1.9 | 13.0 | — |
| BeO | 1.0 | 1.0 | 1.0 | — | — | — | — | — |
| $Cu_2O$ | 0.7 | 1.0 | 0.5 | 0.5 | 1.0 | 1.0 | 1.0 | 1.0 |
| Heating rate (°C/hr) | 170 | 170 | 170 | 170 | 170 | 170 | 170 | 170 |
| First heat treatment | | | | | | | | |
| Maximum temp. (°C) | 800 | 950 | 950 | 820* | 820* | 850 | 900 | 900 |
| Holding time (hr.) | 1 | 1 | 1 | ½ | ½ | 1 | 1 | 1 |

TABLE I —Continued

| Run No. | 1 | 2 | 3 | 4 | 5 | 6 | 7 | 8 |
|---|---|---|---|---|---|---|---|---|
| Second heat treatment | | | | | | | | |
| Temperature (°C) | 400 | 800 | 800 | 350 | 600 | 550 | 700 | 900 |
| Holding time (min.) | 20 | 1.2 | 1.6 | 3 | 5 | 10 | 1 | ½ |
| Third heat treatment | | | | | | | | |
| Temperature (°C) | 400 | 800 | 800 | 300 | 600 | 400 | 700 | 800 |
| Holding time (min.) | 30 | 10 | 5 | 15 | 3 | 4 | ½ | 1 |
| Resistance (Ω) | <1 | <1 | 15 | 500 | <1 | <1 | <1 | 10 |

*In the first heat treatment in the case of Runs 4 and 5, the samples were held for a half hour at 600° C. prior to the half hour at 820° C. shown in the table.

The coherent force of the copper coatings obtained in these runs were strong in every instance. When the product of Run 5 was measured, for example, it was 1.8 kg/mm².

In Run 5 the electrical resistance of the product which received only the first heat treatment but did not receive the second and third heat treatments was $10^{10}$ Ω. This denotes that a substantial portion of the copper particles deposited on the surface of the sample are present thereon in isolation from one another.

EXAMPLE 2

A glass of the following composition (wt. percent) was used, and cylindrical samples identical to that described in Example 1 were prepared.

| | |
|---|---|
| SiO₂ | 53.4 |
| Al₂O₃ | 16.6 |
| LiO₂ | 1.9 |
| MgO | 7.6 |
| CaO | 5.4 |
| B₂O₃ | 0.8 |
| Na₂O | 4.0 |
| ZrO₂ | 2.7 |
| F | 6.5 |
| Cu₂O | 1.0 |

In the first heat treatment these samples were raised to a temperature of 950° C. by heating in every instance at the rate of 170° C. per hour, which temperature was held for one hour. This was followed by submitting the samples to the second and third treatments while varying the conditions. Fourteen runs (Nos. 9 – 22) were carried out in this manner. The surrounding atmospheres employed in the several steps were the same as those of Example 1. The results obtained are shown in Table II. It can be appreciated that the electrical resistance of the coating of the final product can be controlled by varying the conditions under which the second and third heat treatments are given.

Table II

| Run No. | Second heat treatment Temp. (°C) | Time (min.) | Third heat treatment Temp. (°C) | Time (min.) | Electrical resistance (Ω) |
|---|---|---|---|---|---|
| 9 | 950 | ¼ | 950 | ½ | 2 |
| 10 | 950 | ⅓ | 950 | 20 | 500 |
| 11 | 850 | ½ | 850 | 1 | 80 |
| 12 | 850 | 15 | 850 | 40 | 3 |
| 13 | 750 | 1/12 | 750 | 20 | 900 |
| 14 | 750 | 3 | 750 | 30 | <1 |
| 15 | 650 | ½ | 650 | 1 | 100 |
| 16 | 650 | 5 | 650 | 10 | <1 |
| 17 | 550 | ½ | 550 | 1 | <1 |
| 18 | 550 | 5 | 550 | 20 | <1 |
| 19 | 450 | ½ | 450 | 30 | <1 |
| 20 | 450 | 5 | 450 | 20 | 30 |
| 21 | 350 | 1 | 350 | 30 | 150 |
| 22 | 350 | 40 | 350 | 70 | <1 |

EXAMPLE 3

Example 1 was repeated except that silver compounds were used as the compound for forming the metallic coating. Seven runs (Nos. 23–29) were conducted. As the silver compound, silver chloride was used in Runs 25 and 28, while silver nitrate was used in the rest of the runs. In every instace a glass-ceramic body having a strong closely bonded silver coating was obtained. The compositions of the glasses, the heat treatment conditions in the several stages, and the electrical resistances of the resulting products are shown in Table III. The terms used in the table have the same meanings as those of Table 1.

TABLE III

| Run No. | 23 | 24 | 25 | 26 | 27 | 28 | 29 |
|---|---|---|---|---|---|---|---|
| Glass composition (wt. %) | | | | | | | |
| SiO₂ | 59.0 | 57.8 | 58.5 | 62.4 | 62.5 | 52.4 | 67.0 |
| Al₂O₃ | 15.0 | 11.9 | 11.9 | 9.7 | 18.8 | 4.6 | 16.9 |
| Li₂O | 5.0 | 2.1 | 2.0 | — | 5.0 | 10.7 | 5.2 |
| MgO | 6.0 | 8.3 | 8.8 | 7.4 | — | 10.7 | 3.4 |
| CaO | — | 6.1 | 6.2 | 7.9 | — | — | — |
| B₂O₃ | 4.0 | — | — | — | — | — | — |
| Na₂O | — | 3.7 | 3.7 | 6.1 | — | — | — |
| K₂O | — | 0.9 | 0.8 | — | — | — | — |
| PbO | — | — | — | — | 0.2 | — | — |
| MoO₃ | — | — | — | 3.3 | — | — | — |
| CaF₂ | — | — | — | — | 13.0 | — | — |
| ZrO₂ | 4.0 | 3.0 | 3.1 | — | — | 7.6 | — |
| F | 5.0 | 5.2 | 4.2 | 2.2 | — | — | — |
| TiO₂ | — | — | — | — | — | — | 6.5 |

TABLE III — Continued

| Run No. | 23 | 24 | 25 | 26 | 27 | 28 | 29 |
|---|---|---|---|---|---|---|---|
| $P_2O_5$ | — | — | — | — | — | 13.0 | — |
| BeO | 1.0 | — | — | — | — | — | — |
| $Ag_2O$ | 1.0 | 1.0 | 1.0 | 1.0 | 0.5 | 1.0 | 1.0 |
| Heating rate (°C/hr.) | 170 | 170 | 170 | 170 | 170 | 170 | 170 |
| First heat treatment | | | | | | | |
| Maximum temp. (°C) | 850 | 800* | 800* | 850 | 850 | 900 | 900 |
| Holding time (hr.) | 1 | ½ | ½ | 1 | 2 | 1 | 1 |
| Second heat treatment | | | | | | | |
| Temperature (°C) | 350 | 750 | 550 | 650 | 800 | 700 | 900 |
| Holding time (min.) | 20 | 2 | 5 | 2 | ½ | 1 | ½ |
| Third heat treatment | | | | | | | |
| Temperature (°C) | 350 | 750 | 550 | 650 | 800 | 700 | 700 |
| Holding time (min.) | 10 | 1 | 3 | 1 | 1 | ½ | 3 |
| Resistance (Ω) | 200 | <1 | <1 | 30 | 70 | 30 | 70 |

* In the first heat treatment in the case of Runs 24 and 25, the samples were held for 1 hour at 600°C. prior to the one hour at 800°C. indicated in the table.

EXAMPLE 4

Example 1 was repeated but using as the metallic coat-forming compound both a copper compound and a silver compound in conjunction. Six runs (Nos. 30–35) were carried out. In each run the temperature was raised to the first heat treatment temperature at the rate of 170° C. per hour, and in every instance a glass-ceramic body having a strongly adherent metallic coating consisting of both copper and silver was finally obtained. The compositions of the glass batches, the heat treatment conditions of the several stages, and the electrical resistances of the resulting products are shown in Table IV. The terms used in the table have the same meanings as those of Table I. In the case of the first heat treatment of Run 31, the sample was held for one hour at 600° C. prior to the half hour at 800° C. shown in the table.

What is claimed is:

1. In the method of producing a metal coated glass-ceramic article, the crystalline structure of the glass-ceramic being β-eugriptite, β-spodumen, anorthoclase, diopside or anthophirite, by melting a glass-forming batch containing silica and alumina as the main components and a nucleating agent and 0.05 to 5 percent by weight, calculated as metal based on the total weight of the glass-forming batch, of at least one metal compound selected from copper compounds and silver compounds, forming the melt into a glass article of desired configuration, and heating the formed glass article in a reducing atmosphere to devitrify the glass, while causing the metallic ions generated from said metal compound by said reducing atmosphere to migrate through the glass matrix and diffuse to the surface of said devitrified article and to reduce the metallic ions to the state of metallic particles on the surface, the

TABLE IV

| Run No. | 30 | 31 | 32 | 33 | 34 | 35 |
|---|---|---|---|---|---|---|
| Glass composition (wt. %) | | | | | | |
| $SiO_2$ | 59.0 | 57.8 | 62.4 | 62.5 | 52.4 | 67.0 |
| $Al_2O_3$ | 15.0 | 11.9 | 9.7 | 18.8 | 4.6 | 16.9 |
| $Li_2O$ | 5.0 | 2.1 | — | 5.0 | 10.7 | 5.2 |
| MgO | 6.0 | 8.3 | 7.4 | — | 10.7 | 3.4 |
| CaO | — | 6.1 | 7.9 | — | — | — |
| $B_2O_3$ | 4.0 | — | — | — | — | — |
| $Na_2O$ | — | 3.7 | 6.1 | — | — | — |
| $K_2O$ | — | 0.9 | — | — | — | — |
| PbO | — | — | — | 0.2 | — | — |
| $MoO_3$ | — | — | 3.3 | — | — | — |
| $CaF_2$ | — | — | — | 13.0 | — | — |
| $ZrO_2$ | 4.0 | 3.0 | — | — | 7.6 | — |
| F | 5.0 | 5.2 | 2.2 | — | — | — |
| $TiO_2$ | — | — | — | — | — | 6.5 |
| $P_2O_5$ | — | — | — | — | 13.0 | — |
| BeO | 1.0 | — | — | — | — | — |
| $Cu_2O$ | 0.5 | 0.5 | 1.0 | 0.3 | 0.3 | 0.7 |
| $Ag_2O$ | 0.5 | 0.5 | 0.5 | 0.2 | 0.7 | 0.3 |
| First heat treatment | | | | | | |
| Maximum temp. (°C) | 850 | 800* | 850 | 850 | 900 | 900 |
| Holding time (hr.) | 1 | ½ | 1 | 2 | 1 | 1 |
| Second heat treatment | | | | | | |
| Temperature (°C) | 400 | 750 | 800 | 350 | 700 | 900 |
| Holding time (min.) | 15 | 2 | ½ | 5 | 1 | ½ |
| Third heat treatment | | | | | | |
| Temperature (°C) | 400 | 750 | 800 | 350 | 700 | 700 |
| Holding time (min.) | 10 | 1 | 1 | 10 | ½ | 3 |
| Resistance (Ω) | 5 | 1 | 80 | 1000 | 500 | 800 | improvement which comprises carrying out the heat treatment in three stages: a first step of heating the formed glass article in a reducing atmosphere to a temperature between the transition point and the melting point of the metal with which the article is to be coated, at a rate not exceeding 300° C. per hour and maintaining said temperature for a period of time of from about 15 minutes to about 5 hours, followed by a second step of heating the article in an oxidixing atmosphere, at a temperature between about 200° C. and the melting point of said metal for a period of time of from about one second to about 1.5 hours, to oxidize by said oxidizing atmosphere at least a part of the metallic particles to the state of metal oxide crystalline particles bonded to each other, and thereafter a third step of heating the so obtained article again in a reducing atmosphere, at a temperature between about 200° C. and the melting point of said metal for a period of time of at least about 30 seconds, to reduce by said reducing atmosphere at least a part of said metal oxide to its metallic state on the surface of the devitrified article.

2. The method of claim 1 wherein the first heat treatment consists in raising the temperature of said formed glass article at a rate not exceeding 170° C. per hour to a temperature between the transistion point of glass and the melting point of the metal with which the article is to be coated followed by holding the article at this temperature for a period of time from about 15 minutes to about 5 hours.

3. The method of claim 1 wherein the glass-forming batch consists essentially of:
   a. a glass selected from the group consisting of:
   $SiO_2$ 40–88 percent, $Al_2O_3$ 1.0–35 percent and $Li_2O$ 0.5–30 percent;
   $SiO_2$ 40–88 percent, $Al_2O_3$ 1.0–35 percent, $Li_2O$ 0.5–30 percent and MgO 0.5–30 percent;
   $SiO_2$ 40–88 percent, $Al_2O_3$ 1.0–35 percent, $Li_2O$ 0.5–30 percent, MgO 1.0–30 percent and CaO 1–15 percent; and
   $SiO_2$ 40–88 percent, $Al_2O_3$ 1.0–35 percent, MgO 1.0–30 percent and CaO 1–15 percent
   b. an added glass compound selected from the group consisting of:
   $B_2O_3$ 0–10 percent; 0–22 percent of $Na_2O$, $K_2O$ or mixtures; and PbO 0–15 percent
   c. a nucleating agent selected from the group consisting of the following compounds and combinations of compounds:
   $TiO_2$ 0.5–20 percent;
   $ZrO_2$ 0.5–15 percent;
   F 0.2–15 percent;
   $P_2O_5$ 0.5–20 percent;
   $TiO_2$ 0.5–20 percent and $ZrO_2$ 0.5–15 percent;
   $TiO_2$ 0.5–20 percent, $ZrO_2$ 0.5–15 percent and F 0.2–15 percent;
   $ZrO_2$ 0.5–15 percent and F 0.2–15 percent;
   $TiO_2$ 0.5–20 percent and F 0.2–15 percent;
   $P_2O_5$ 0.5–20 percent and F 0.2–15 percent;
   $TiO_2$ 0.5–20 percent and $P_2O_5$ 0.5–20 percent;
   $ZrO_2$ 0.5–15 percent and $P_2O_5$ 0.5–20 percent;
   $TiO_2$ 0.5–20 percent, $P_2O_5$ 0.5–20 percent and F 0.2–15 percent;
   $ZrO_2$ 0.5–15 percent, $P_2O_5$ 0.5–20 percent and F 0.2–15 percent;
   $TiO_2$ 0.5–20 percent, $ZrO_2$ 0.5–15 percent and $P_2O_5$ 0.5–20 percent;
   $TiO_2$ 0.5–20 percent, $ZrO_2$ 0.5–15 percent, $P_2O_5$ 0.5–20 percent and F 0.2–15 percent;
   and a combination of one of above nucleating agents with at least one member selected from $CaF_2$, $S_nO_2$, BeO, $Cr_2O_3$, $V_2O_5$, NiO, $As_2O_3$ and $MoO_3$ in an amount of 1–10 percent; and
   d. at least one metal compound selected from oxides, chlorides, sulfates and nitrates of copper and silver in an amount of 0.05–5 percent, calculated as the metal.

* * * * *